United States Patent
Li et al.

(10) Patent No.: US 11,205,446 B1
(45) Date of Patent: *Dec. 21, 2021

(54) SPIN-ORBIT TORQUE INDUCED MAGNETIZATION SWITCHING IN A MAGNETIC RECORDING HEAD

(71) Applicant: Western Digital Technologies, Inc., San Jose, CA (US)

(72) Inventors: Zhanjie Li, Pleasanton, CA (US); Suping Song, Fremont, CA (US); Kuok San Ho, Emerald Hills, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,958

(22) Filed: Feb. 27, 2020

Related U.S. Application Data

(60) Provisional application No. 62/824,821, filed on Mar. 27, 2019.

(51) Int. Cl.
*G11B 5/127* (2006.01)
*G11B 5/02* (2006.01)
(Continued)

(52) U.S. Cl.
CPC .............. *G11B 5/1278* (2013.01); *G11B 5/02* (2013.01); *G11B 5/314* (2013.01); *G11B 5/3912* (2013.01);
(Continued)

(58) Field of Classification Search
CPC ..... G11B 5/314; G11B 5/3116; G11B 5/3909; G11B 5/3912; G11B 5/02; G11B 2005/0024; G11B 5/1278; G11B 5/3133
(Continued)

(56) References Cited

U.S. PATENT DOCUMENTS

| 8,295,006 B2 | 10/2012 | Sugano et al. |
| 8,582,240 B1 | 11/2013 | Chen et al. |

(Continued)

FOREIGN PATENT DOCUMENTS

| CN | 104835510 B | 11/2017 |
| JP | 2013251042 A | 12/2013 |

(Continued)

OTHER PUBLICATIONS

Jian-Gang Zhu et al., "Microwave Assisted Magnetic Recording", IEEE Transactions on Magnetics, IEEE Service Center, New York, NY, US, vol. 44, No. 1, pp. 125-131.

(Continued)

*Primary Examiner* — Brian E Miller
(74) *Attorney, Agent, or Firm* — Patterson & Sheridan, LLP; Steven H. Versteeg

(57) ABSTRACT

The present disclosure generally relates to magnetic media devices, and more specifically, to a magnetic media drive employing a magnetic recording head. The recording head includes a main pole, a trailing shield hot seed layer, a spin Hall layer disposed between the main pole and the trailing shield hot seed layer, and a spin-torque layer disposed between the main pole and the trailing shield hot seed layer. Spin-orbit torque (SOT) is generated from the spin Hall layer. The spin-torque layer magnetization switching or precession is induced by the SOT. The SOT based head reduces the switching current and the $V_{jump}$ due to higher spin polarization ratio, which improves energy efficiency. In addition, the spin Hall layer and the spin-torque layer are easier to form compared to the conventional pseudo spin-valve structure.

20 Claims, 6 Drawing Sheets

(51) Int. Cl.
*G11B 5/39* (2006.01)
*G11B 5/31* (2006.01)
*G11B 5/00* (2006.01)

(52) U.S. Cl.
CPC ........... *G11B 5/3116* (2013.01); *G11B 5/3133* (2013.01); *G11B 5/3909* (2013.01); *G11B 2005/0024* (2013.01)

(58) Field of Classification Search
USPC .......................................... 360/125.3–125.5
See application file for complete search history.

(56) References Cited

U.S. PATENT DOCUMENTS

| | | | |
|---|---|---|---|
| 9,001,465 B1 | 4/2015 | Shimizu et al. | |
| 9,099,119 B2 | 8/2015 | Mihajlovic et al. | |
| 9,105,832 B2 | 8/2015 | Buhrman et al. | |
| 9,196,271 B1 | 11/2015 | Shirotori et al. | |
| 9,218,864 B1 | 12/2015 | Yi et al. | |
| 9,230,571 B1 | 1/2016 | Chen et al. | |
| 9,275,672 B2 | 3/2016 | Shiroishi et al. | |
| 9,368,135 B2 | 6/2016 | Gao | |
| 9,406,317 B1 | 8/2016 | Tang et al. | |
| 9,508,364 B1 | 11/2016 | Tang et al. | |
| 9,881,637 B1 | 1/2018 | Wilson et al. | |
| 10,014,012 B1* | 7/2018 | Song | G11B 5/235 |
| 10,121,497 B1 | 11/2018 | Takahashi et al. | |
| 10,181,334 B1* | 1/2019 | Song | G11B 5/3133 |
| 10,186,284 B2 | 1/2019 | Narita et al. | |
| 10,210,888 B1* | 2/2019 | Li | H01L 43/04 |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,403,309 B2 | 9/2019 | Li et al. | |
| 10,650,847 B2* | 5/2020 | Li | G11B 5/3116 |
| 10,714,136 B1 | 7/2020 | Chen | G11B 5/3133 |
| 10,789,977 B1* | 9/2020 | Song | G11B 5/3906 |
| 10,839,831 B1* | 11/2020 | Nguyen | G11B 5/4813 |
| 10,867,626 B1* | 12/2020 | Li | G11B 5/1278 |
| 2008/0273277 A1 | 11/2008 | Guan et al. | |
| 2008/0304176 A1 | 12/2008 | Takagishi et al. | |
| 2009/0059423 A1 | 3/2009 | Yamada et al. | |
| 2009/0161265 A1 | 6/2009 | Sugano et al. | |
| 2009/0310244 A1 | 12/2009 | Shimazawa et al. | |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2015/0007800 A1 | 1/2015 | Wade et al. | |
| 2015/0070799 A1 | 3/2015 | Dimitrov et al. | |
| 2015/0077883 A1 | 3/2015 | Kudo et al. | |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |
| 2019/0088275 A1 | 3/2019 | Narita et al. | |
| 2019/0147907 A1* | 5/2019 | Li | G11B 5/3133 360/112 |
| 2019/0279665 A1* | 9/2019 | Li | G11B 5/3146 |

FOREIGN PATENT DOCUMENTS

| | | |
|---|---|---|
| JP | 2018156709 A | 10/2018 |
| JP | 201957338 A | 4/2019 |
| WO | 2015126326 A1 | 8/2015 |
| WO | 2018111356 A1 | 6/2018 |

OTHER PUBLICATIONS

Chen Tingsu et al., "Spin-Torque and Spin-Hall Nano-Oscillators", Proceedings of the IEEE, IEEE, New York, vol. 104, No. 10, pp. 1919-1945.

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

Manipatruni et al. "Voltage and Energy-Delay Performance of Giant Spin Hall Effect Switching for Magnetic Memory and Logic," arXiv, Condensed Matter, Mesoscale and Nanoscale Physics, Cornell University, submitted on Jan. 23, 2013, 16 pages, arXiv:1301.5374v1 <https://arxiv.org/abs/1301.5374v1>.

Kim et al. "DSH-MRAM: Differential Spin Hall MRAM for On-Chip Memories," IEEE Electron Device Letters, vol. 34, No. 10, Oct. 2013, 11 pages, arXiv:1305.4085v1 <https://arxiv.org/abs/1305.4085v1>.

International Preliminary Report on Patentability for International Application No. PCT/US2017/047629 dated Jun. 27, 2019 (8 pages).

* cited by examiner

SPIN-ORBIT TORQUE INDUCED MAGNETIZATION SWITCHING IN A MAGNETIC RECORDING HEAD

CROSS-REFERENCE TO RELATED APPLICATIONS

This application claims benefit of U.S. provisional patent application Ser. No. 62/824,821, filed Mar. 27, 2019, which is herein incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic media device, such as a hard disk drive (HDD). Conventionally, MAMR enabled magnetic recording is based on spin-transfer torque (STT), which is generated from a pseudo spin-valve structure. During operation, electrical current flows from the main pole to the trailing shield hot seed layer, and the spin-torque layer magnetization switching (or precession) is induced by the STT.

The pseudo spin-valve structure is difficult to make, and high switching current and voltage ($V_{jump}$) are utilized during its operation, leading to a lower level of energy efficiency.

SUMMARY OF THE DISCLOSURE

Certain embodiments generally relate to a magnetic recording head including a main pole, a trailing shield, a spin Hall means, and a spin torque means. The spin Hall means and the spin torque means are disposed between the main pole and the trailing shield. The spin Hall means generates a spin-orbital torque. The spin torque means precesses from the spin-orbital torque.

Certain embodiments generally relate to a method of writing data to a magnetic medium including providing a spin torque structure proximate a main pole and a trailing shield. The spin torque structure is disposed over a spin Hall structure. An electrical current is injected to the spin Hall structure. A spin-orbit torque is generated from the spin Hall structure. Precession of the spin torque structure is induced from the spin-orbital torque.

Certain additional embodiments generally relate to a method of writing data to a magnetic medium including providing a spin torque structure between a main pole and a notchless trailing shield. The spin torque structure is disposed over a spin Hall structure. An electrical current is injected to the spin Hall structure. A spin-orbit torque is generated from the spin Hall structure. Precession of the spin torque structure is induced from the spin-orbital torque.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole, a trailing shield hot seed layer, a spin Hall layer disposed between the main pole and the trailing shield hot seed layer, and a spin-torque layer disposed between the main pole and the trailing shield hot seed layer. Spin-orbit torque (SOT) is generated from the spin Hall layer. The spin-torque layer magnetization switching (or precession) is induced by the SOT. The SOT based head reduces the switching current and the $V_{jump}$ due to higher spin polarization ratio, which improves energy efficiency. In addition, the spin Hall layer and the spin-torque layer are easier to form compared to the conventional pseudo spin-valve structure.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
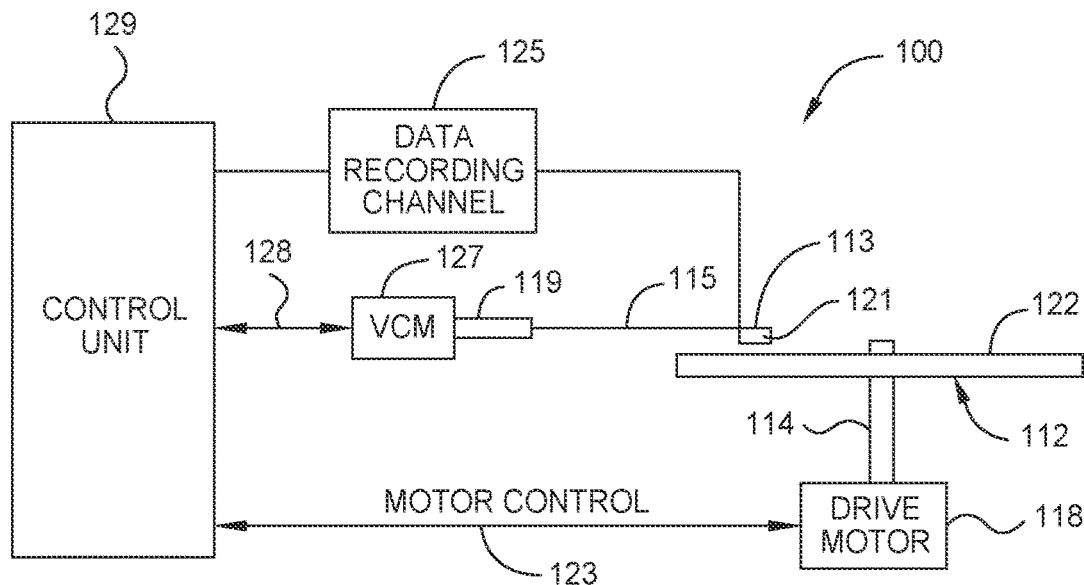
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a spin Hall layer for generating SOT. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
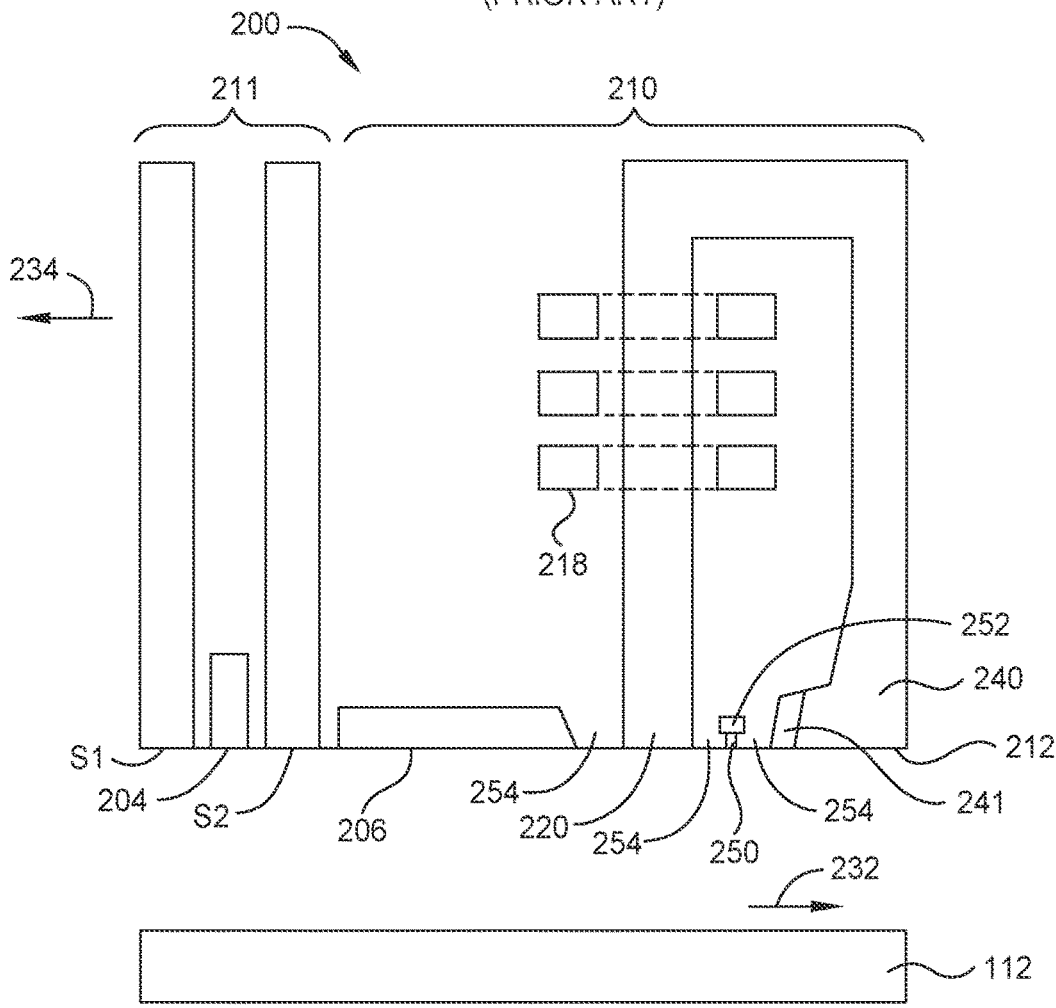
FIG. 2 is a fragmented, cross sectional side view of a read/write head facing a magnetic disk according to one embodiment.

FIG. 2 is a fragmented, cross sectional side view of a read/write head 200 facing the magnetic disk 112 according to one embodiment. The read/write head 200 may correspond to the magnetic head assembly 121 described in FIG. 1. The read/write head 200 includes a media facing surface (MFS) 212, such as an air bearing surface (ABS), facing the disk 112, a magnetic write head 210, and a magnetic read head 211. As shown in FIG. 2, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a leading shield 206, a main pole 220, a trailing shield 240, a spin-torque layer 250, a spin Hall layer 252, and a coil 218 that excites the main pole 220. The coil 218 may have a "pancake" structure which winds around a back-contact between the main pole 220 and the trailing shield 240, instead of a "helical" structure shown in FIG. 2A. The spin-torque layer 250 and the spin Hall layer 252 are disposed between the main pole 220 and the trailing shield 240. A trailing shield hot seed layer 241 may be coupled to the trailing shield 240, and the trailing shield hot seed layer 241 may face the spin-torque layer 250 and the spin Hall layer 252. The space between the spin-torque layer 250 (including the spin Hall layer 252) and the main pole 220 is filled with a dielectric material 254, such as alumina. The dielectric material 254 is also disposed between the spin-torque layer 250 (including the spin Hall layer 252) and the trailing shield hot seed layer 241, and between the leading shield 206 and the main pole 220. The main pole 220 may be a magnetic material such as a FeCo alloy. The trailing shield 240 may be a magnetic material such as NiFe alloy. The trailing shield hot seed layer 241 may include a high moment sputter material, such as CoFeN or FeXN, where X includes at least one of Rh, Al, Ta, Zr, and Ti. In certain aspects, the spin-torque layer 250 or spin-torque structure enables use of a trailing shield 240 without a notch (i.e., a notchless trailing shield). A trailing shield with a notch (i.e., a notched trailing shield) is used to reflect electrons and to polarize the reflected electrons to a pseudo spin-valve structure. Forming a trailing shield with a notch causes extra manufacturing steps and quality control steps. In certain embodiments, a SOT based head with a spin-torque layer 250 or spin-torque structure reduces manufacturing and/or quality control costs.

The spin-torque layer 250 may be a magnetic material, such as a soft magnetic material, for example CoFe alloy, NiFe alloy, CoFeB alloy or half-metals. The spin Hall layer 252 may be a heavy metal, such as beta phase Tantalum (β-Ta), beta phase tungsten (β-W), platinum (Pt), hafnium (Hf), a heavy metal alloy of tungsten with hafnium, iridium, or bismuth doped copper, a topological insulator such as a (Bi,Sb)Te, or antiferromagnetic materials such as MnIr, XMn (X=Fe, Pd, Ir, and Pt) and Cu—Au—I type antiferromagnets. In some embodiments, the spin Hall layer 252 may be coupled to the spin-torque layer 250 (i.e., the spin Hall layer 252 may be in direct contact with the spin-torque layer 250). In some embodiments, one or more intervening layers may be disposed between the spin Hall layer 252 and the spin-torque layer 250. During operation, an electrical current flows through the spin Hall layer 252, which has strong spin-orbit coupling, and the spin Hall layer 252 generates SOT. The SOT generated by the spin Hall layer 252 induces magnetization switching (or precession) of the spin-torque layer 250. In some embodiments, the SOT based head has an effective spin injection efficiency (β) of about 0.3 to 1.75, about 3 to 12 times larger than that of a head using a pseudo spin-valve structure (having an effective spin injection efficiency (β) of about 0.1 to 0.30). The effective spin injection efficiency (β) is defined by formula (I):

$$\beta = \frac{J_S}{J_e} = \frac{\pi w}{4 t_{SH}} \theta_{SH} \left(1 - \text{sech}\left(\frac{t_{SH}}{\lambda_{sf}}\right)\right) \tag{I}$$

in which W is the width of the spin torque structure, $t_{SH}$ is the thickness of the spin Hall structure, $\Theta_{SH}$ is the spin Hall angle, and $\lambda_{sf}$ is the spin-flip length of the spin Hall structure.

Higher effective spin injection efficiency leads to reduced critical switching current density, which is defined by the formula (II):

$$J_{C0} \approx \frac{2e}{\hbar} \mu_0 M_S t\alpha (H_C + M_{\mathit{eff}}/2)/\beta \qquad \text{(II)}$$

Based on this formula, the 3 to 12 times increase in effective spin injection efficiency ($\beta$) for the SOT based head leads to a reduction of the critical switching current density by 3 to 12 times, which in turn brings a higher energy efficiency (about 3 to 12 times less energy used than that of a head using a pseudo spin-valve structure). Since the spin injection efficiency is higher, a lower electrical current is injected to the spin Hall structure to cause switching of the spin torque layer in comparison to a pseudo spin-valve structure. Since a lower electrical current is injected, there is reduced joule heating of the spin Hall structure and reduced associated heating of the spin torque structure which leads to greater reliability of the SOT based head in comparison to a head using a pseudo spin-valve structure.

Figure 3A:
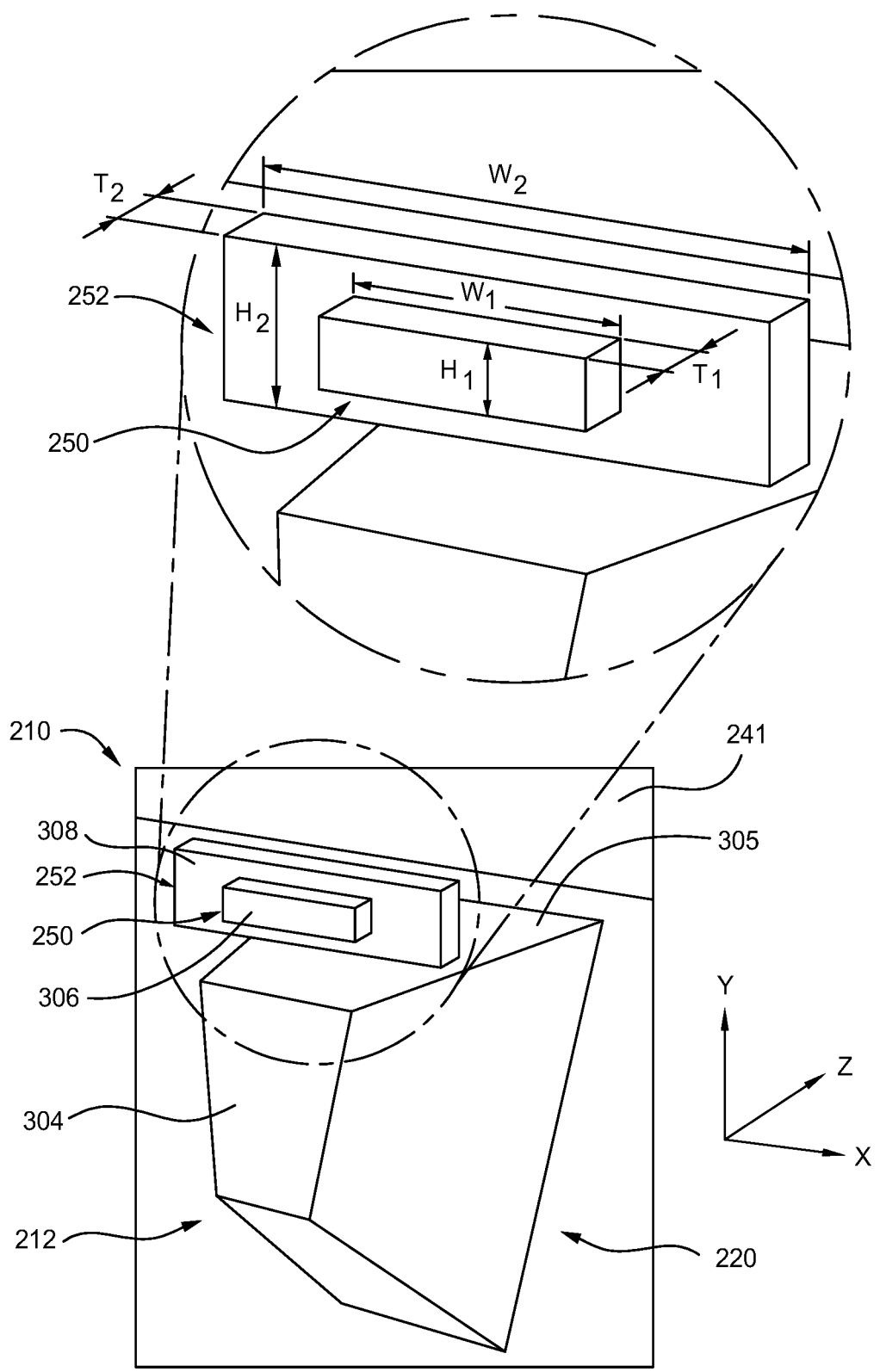
FIG. 3A is a perspective view of a portion of a magnetic write head of FIG. 2 according to one embodiment.

FIG. 3A is a perspective view of a portion of the magnetic write head 210 of FIG. 2 according to one embodiment. As shown in FIG. 3A, the magnetic write head 210 includes the main pole 220, the trailing shield hot seed layer 241, the spin-torque layer 250 disposed between the trailing shield hot seed layer 241 and the main pole 220, and the spin Hall layer 252 disposed between the trailing shield hot seed layer 241 and the main pole 220. The dielectric material 254 is omitted for clarity. The main pole 220 includes a first surface 304 and a second surface 305 adjacent the first surface 304. The first surface 304 may be at the MFS 212 and the second surface 305 may face the spin-torque layer 250 and the spin Hall layer 252. The spin-torque layer 250 includes a first surface 306 at the MFS 212, and the spin-torque layer 250 is coupled to a first surface 308 of the spin Hall layer 252. The spin Hall layer 252 is recessed from the MFS 212. In other words, no portion of the spin Hall layer 252 is at the MFS 212.

The spin-torque layer 250 has a height $H_1$ in the Y direction (down-track direction) ranging from about 3 nm to about 25 nm, a thickness $T_1$ in the Z direction ranging from about 1.5 nm to about 15 nm, such as about 3 nm, and a width $W_1$ in the X direction (cross-track direction). The spin Hall layer 252 has a height $H_2$ in the Y direction ranging from about 5 nm to about 25 nm (which is less than the write gap, defined by the distance between the second surface 305 of the main pole 220 to the trailing shield hot seed layer 241), a thickness $T_2$ in the Z direction ranging from about 2.5 nm to about 100 nm, and a width $W_2$ in the X direction. In one embodiment, the spin Hall layer 252 is thicker than the spin-torque layer 250. In one embodiment, the spin Hall layer 252 is thinner than the spin-torque layer 250. In one embodiment, the width of the spin-torque layer 250 is the same as or smaller than the width of the spin Hall layer 252. In one embodiment, the height of the spin-torque layer 250 is the same as or smaller than the height of the spin Hall layer 252. During operation of the SOT based head, the electrical current flows from the preamp (not shown) to and through the spin Hall layer 252 in the X direction. By contrast, during operation of a head that uses a pseudo spin-valve structure, the electrical current flows from the main pole to the trailing shield, i.e., in the Y direction.

Figure 3B:
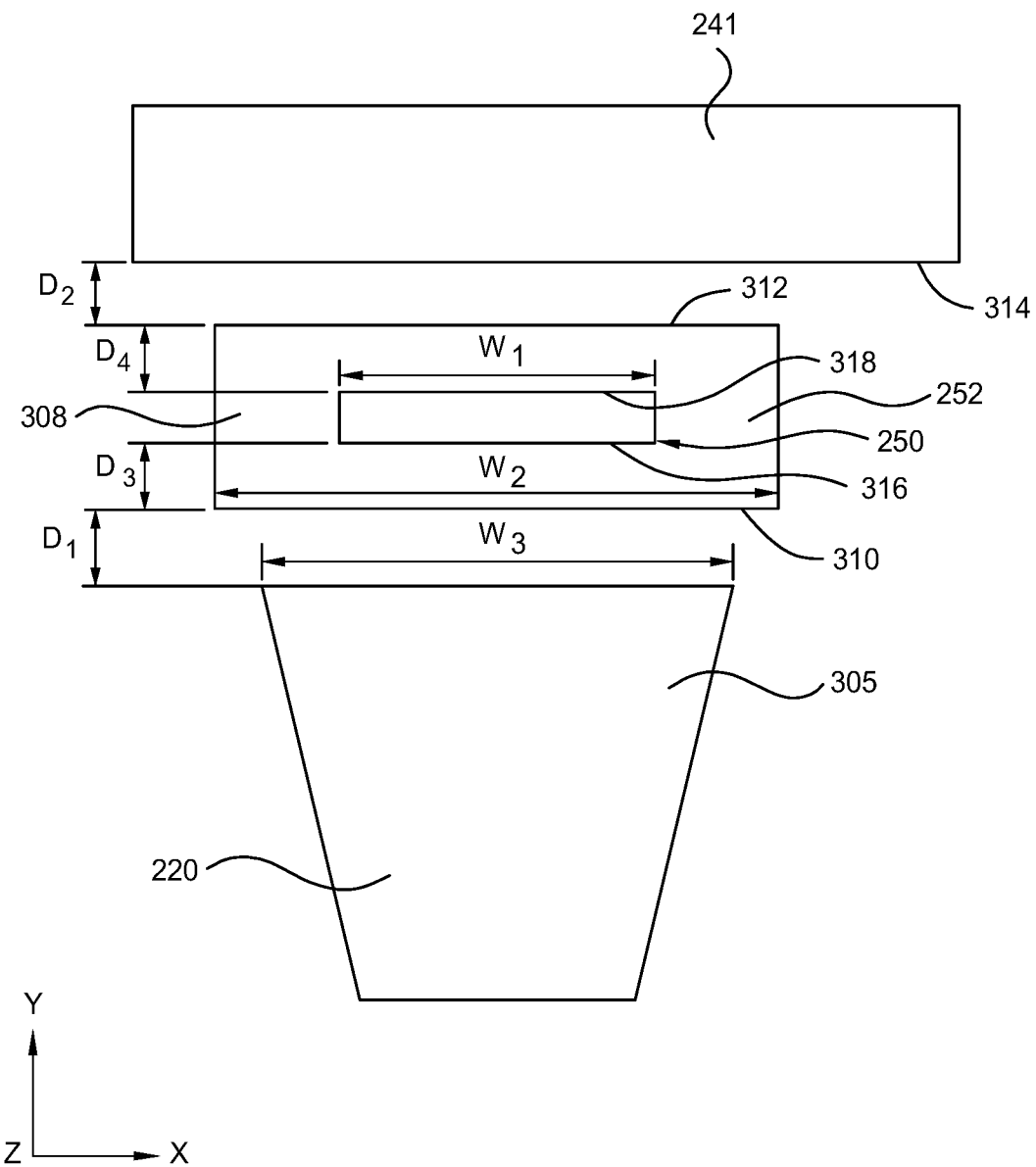
FIG. 3B is a MFS view of the portion of the magnetic write head shown in FIG. 3 according to one embodiment.

FIG. 3B is a MFS view of the portion of the magnetic write head 210 shown in FIG. 3A according to one embodiment. As shown in FIG. 3B, the spin Hall layer 252 includes a second surface 310 facing the second surface 305 of the main pole 220 and a third surface 312 facing a surface 314 of the trailing shield hot seed layer 241. The second surface 305 of the main pole 220 and the second surface 310 of the spin Hall layer 252 are separated by a distance $D_1$, and the surface 314 of the trailing shield hot seed layer 241 and the third surface 312 of the spin Hall layer 252 is separated by a distance $D_2$. The dielectric material 254 (FIG. 2) may be disposed between the second surface 305 of the main pole 220 and the second surface 310 of the spin Hall layer 252 and between the surface 314 of the trailing shield hot seed layer 241 and the third surface 312 of the spin Hall layer 252. In one embodiment, the distance $D_1$ is the same as the distance $D_2$. In one embodiment, the distance $D_1$ is about 2 nm and the distance $D_2$ is about 2 nm. In one embodiment, the distance $D_1$ is not the same as the distance $D_2$.

The spin-torque layer 250 includes a second surface 316 facing the second surface 305 of the main pole 220 and a third surface 318 facing the surface 314 of the trailing shield hot seed layer 241. The second surface 316 and the third surface 318 of the spin-torque layer 250 may be in contact with the first surface 308 of the spin Hall layer 252. The second surface 316 may be in contact with the first surface 308 of the spin Hall layer 252 at a location on the first surface 308 that is a distance $D_3$ away from the second surface 310 of the spin Hall layer 252. The third surface 318 may be in contact with the first surface 308 of the spin Hall layer 252 at a location on the first surface 308 that is a distance $D_4$ away from the third surface 312 of the spin Hall layer 252. In one embodiment, the distance $D_3$ is the same as the distance $D_4$. In one embodiment, the distance $D_3$ is about 2 nm and the distance $D_4$ is about 2 nm. In one embodiment, the distance $D_3$ is not the same as the distance $D_4$.

The width $W_2$ of the spin Hall layer 252 may be greater than the width $W_3$ of the main pole 220 at the MFS 212. The width $W_1$ of the spin-torque layer 250 may be the same, smaller than, or greater than the width $W_3$ of the main pole 220 at the MFS 212.

Figure 4:
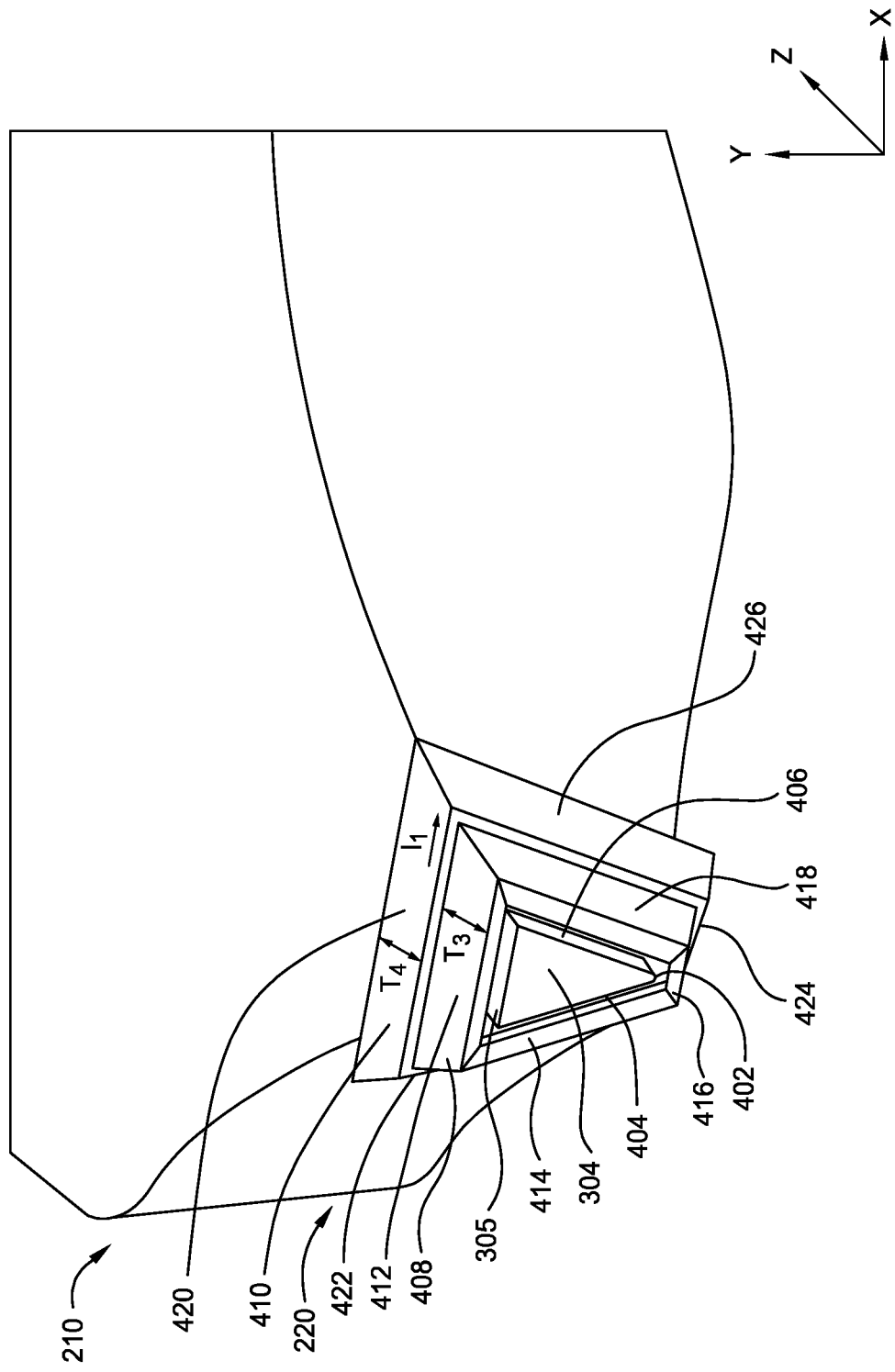
FIG. 4 is a perspective view of a portion of a magnetic write head of FIG. 2 according to another embodiment.

FIG. 4 is a perspective view of a portion of the magnetic write head 210 of FIG. 2 according to another embodiment. As shown in FIG. 4, the main pole 220 includes the first surface 304 at the MFS 212, the second surface 305 adjacent the first surface 304, a third surface 402 opposite the second surface 305, a fourth surface 404 connecting the third surface 402 and the second surface 305, and a fifth surface 406 opposite the fourth surface 404. The main pole 220 at the MFS 212 may be surrounded by a spin-torque structure 408. The spin-torque structure 408 may surround at least three surfaces of the first, second, third, fourth, and fifth surfaces 304, 305, 402, 404, 406. In one embodiment, the spin-torque structure 408 surrounds the second surface 305, the third surface 402, the fourth surface 404, and the fifth surface 406. The spin-torque structure 408 may be made of the same material as the spin-torque layer 250 and may replace the spin-torque layer 250 shown in FIG. 2. The spin-torque structure 408 is coupled to a spin Hall structure 410 recessed from the MFS 212. The spin Hall structure 410 surrounds the main pole 220 at locations recessed from the MFS 212. The spin Hall structure 410 may surround at least three surfaces of the first, second, third, fourth, and fifth surfaces 304, 305, 402, 404, 406. In one embodiment, the spin Hall structure 410 surrounds the second surface 305, the third surface 402, the fourth surface 404, and the fifth surface 406. The spin Hall structure 410 may be made of the same material as the spin Hall layer 252 and may replace the spin Hall layer 252 shown in FIG. 2. During operation, electrical current $I_1$ flows from the preamp (not shown) to the spin Hall structure 410, and the electrical current $I_1$ may flow through the spin Hall structure 410 in a clockwise direction, as shown in FIG. 4. The spin Hall structure 410 generates SOT, which induces magnetization switching (or precession) of the spin-torque structure 408. The spin-torque structure 408 may have a thickness $T_3$ in the Z direction ranging from about 1.5 nm to about 15 nm. The spin Hall structure 410 may have a thickness $T_4$ in the Z direction ranging from about 2.5 nm to about 100 nm. In one embodiment, the thickness $T_4$ of the spin Hall structure 410 is greater than the thickness $T_3$ of the spin-torque structure.

The spin-torque structure 408 may include a first portion 412, a second portion 416 opposite the first portion 412, a third portion 414 connecting the first portion 412 and the second portion 416, and a fourth portion 418 opposite the third portion 414. The first portion 412 may be substantially parallel to the second surface 305 of the main pole 220. The second portion 416 may be substantially parallel to the third surface 402 of the main pole 220. The third portion 414 may be substantially parallel to the fourth surface 404 of the main pole 220. The fourth portion 418 may be substantially parallel to the fifth surface 406 of the main pole 220. A dielectric material, such as the dielectric material 254 shown in FIG. 2, may be disposed between each portion 412, 416, 414, 418 and a corresponding surface of the surfaces 305, 402, 404, 406.

The spin Hall structure 410 may include a first portion 420, a second portion 424 opposite the first portion 420, a third portion 422 connecting the first portion 420 and the second portion 424, and a fourth portion 426 opposite the third portion 422. The first portion 420 of the spin Hall structure 410 may be coupled to the first portion 412 of the spin-torque structure 408, the second portion 424 of the spin Hall structure 410 may be coupled to the second portion 416 of the spin-torque structure 408, the third portion 422 of the spin Hall structure 410 may be coupled to the third portion 414 of the spin-torque structure 408, and the fourth portion 426 of the spin Hall structure 410 may be coupled to the fourth portion 418 of the spin-torque structure 408. Each portion 420, 424, 422, 426 of the spin Hall structure 410 has a width in the X direction and a height in the Y direction, and each portion 412, 416, 414, 418 of the spin-torque structure 408 has a width in the X direction and a height in the Y direction. The width of each portion 420, 424, 422, 426 of the spin Hall structure 410 may be greater than the width of a corresponding portion of the spin-torque structure 408. The height of each portion 420, 424, 422, 426 of the spin Hall structure 410 may be greater than the height of a corresponding portion of the spin-torque structure 408.

Figure 5:
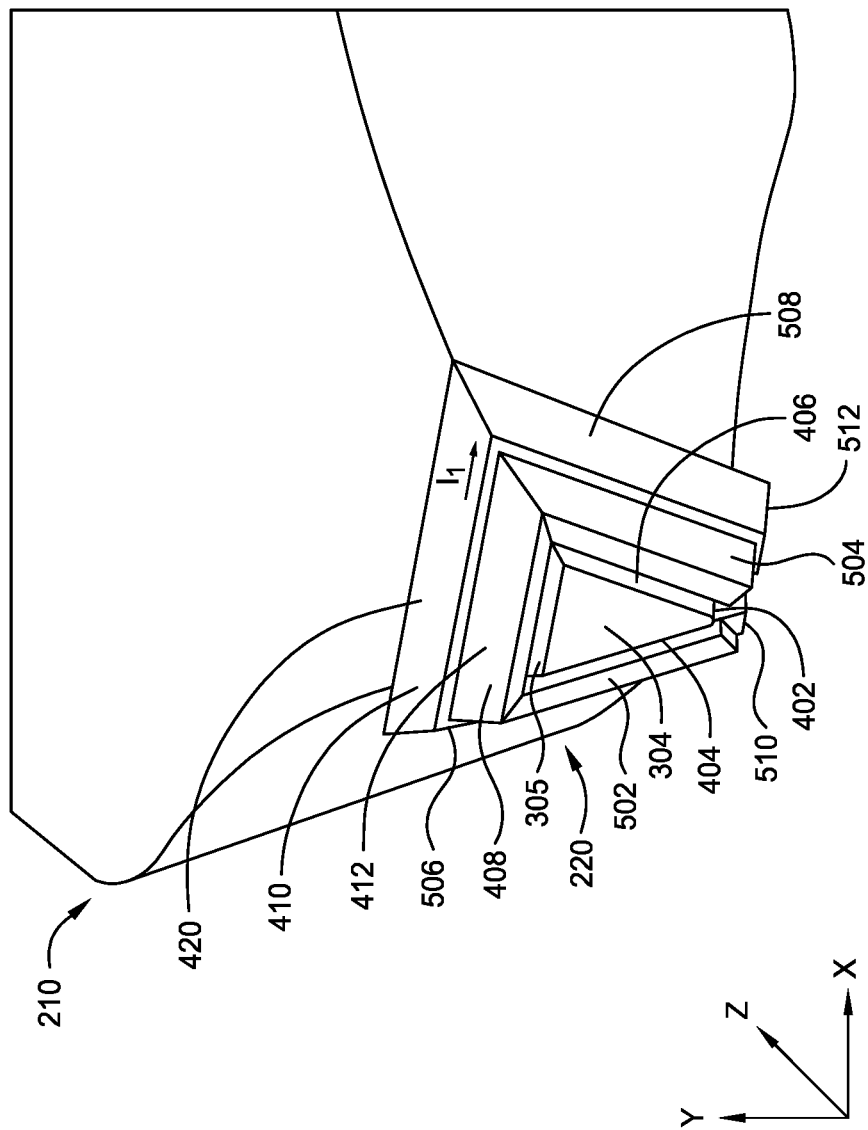
FIG. 5 is a perspective view of a portion of a magnetic write head of FIG. 2 according to another embodiment.

FIG. 5 is a perspective view of a portion of the magnetic write head 210 of FIG. 2 according to another embodiment. As shown in FIG. 5, the spin-torque structure 408 surrounds the second surface 305 of the main pole 220, the fourth surface 404 of the main pole 220, and the fifth surface 406 of the main pole 220. The spin-torque structure 408 does not surround the third surface 402 of the main pole 220. The spin-torque structure 408 surrounds three surfaces 305, 404, 406 of the main pole 220 at the MFS 212. The spin-torque structure 408 includes the first portion 412, a second portion 502 adjacent the first portion 412, and a third portion 504 opposite the second portion 502. The second portion 502 may be the same as the second portion 416 shown in FIG. 4, and the third portion 504 may be the same as the fourth portion 418 shown in FIG. 4. The first portion 412 may be substantially parallel to the second surface 305 of the main pole 220. The second portion 502 may be substantially parallel to the fourth surface 404 of the main pole 220. The third portion 504 may be substantially parallel to the fifth surface 406 of the main pole 220. A dielectric material, such as the dielectric material 254 shown in FIG. 2, may be disposed between each portion 412, 502, 504 and a corresponding surface of the surfaces 305, 404, 406.

The spin Hall structure 410 may include the first portion 420, a second portion 506 adjacent the first portion 420, and a third portion 508 opposite the second portion 506. The first portion 420 of the spin Hall structure 410 may be coupled to the first portion 412 of the spin-torque structure 408, the second portion 506 of the spin Hall structure 410 may be coupled to the second portion 502 of the spin-torque structure 408, the third portion 508 of the spin Hall structure 410 may be coupled to the third portion 504 of the spin-torque structure 408. The second portion 506 of the spin Hall structure 410 may be the same as the third portion 422 shown in FIG. 4, and the third portion 508 of the spin Hall structure 410 may be the same as the fourth portion 426 shown in FIG. 4. The third surface 402 of the main pole 220 is in contact with the dielectric material 254 (FIG. 2), and the dielectric material 254 is in contact with the leading shield 206 (FIG. 2). There is no spin Hall layer or spin-torque layer disposed between the main pole 220 and the leading shield 206 (FIG. 2).

The spin Hall structure 410 may include a first end 510 and a second end 512. The first end 510 and the second end 512 are connected to the preamp (not shown) by leads (not shown). During operation, electrical current $I_2$ flows from the preamp to the first end 510 of the spin Hall structure 410. The electrical current $I_2$ flows through the spin Hall structure 410 in a clockwise direction to the second end 512, as shown in FIG. 5. The spin Hall structure 410 generates SOT, which induces magnetization switching (or precession) of the spin-torque structure 408.

Figure 6:
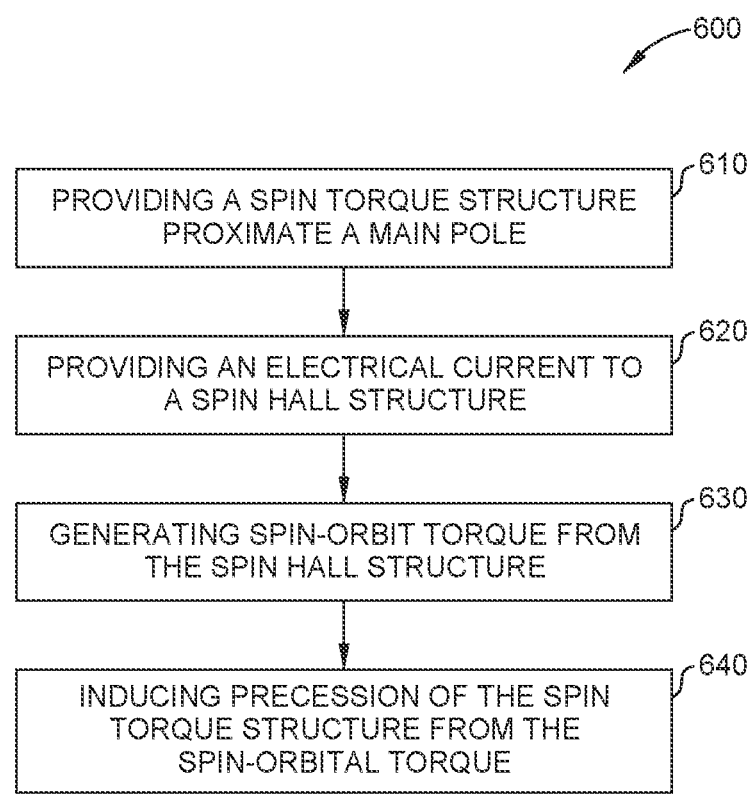
FIG. 6 is a schematic diagram illustrating certain embodiments of a process of writing data to a magnetic medium.

In certain embodiments, as shown in FIGS. 3A, 3B, 4, and 5, the main pole 220 comprises a media facing surface shaped as a trapezoid. In certain embodiments, the spin-torque layer 250 or the spin-torque structure 408 is disposed at least proximate to the long width ($W_3$) of the trapezoid-shaped media facing surface of the main pole 220. In certain aspects, the spin-torque layer 250 or spin-torque structure 408 has a large surface area, such as a large media facing surface area, disposed at least proximate to the long width ($W_3$) of the trapezoid-shaped media facing surface of the main pole, FIG. 6 is a schematic diagram illustrating certain embodiments of a process 600 of writing data to a magnetic medium. At block 610, the process 600 includes providing a spin torque structure proximate a main pole. The spin torque structure comprises the spin-torque layer 250 or the spin-torque structure 408 of FIGS. 3A, 3B, 4, and 5 or other suitable spin torque structures. In certain embodiments, the spin torque structure is disposed between the main pole and a trailing shield, such as a notchless trailing shield. In certain embodiments, the spin torque structure is disposed over a spin Hall structure, such as the spin Hall layer 252 or the spin Hall structure 410 of FIGS. 3A, 3B, 4, and 5 or other suitable spin Hall structures. In certain embodiments, the spin torque structure and the spin Hall structure are wrapped around the main pole. In certain embodiments, a dielectric material is provided between the spin torque structure and the main pole to electrically isolate the spin torque structure from the main pole.

At block 620, the process 600 includes injecting an electrical current to the spin Hall structure. In certain embodiments, the spin Hall structure is disposed at least partially between the main pole and the trailing shield. In certain embodiments, the spin Hall structure is recessed from a media facing surface of the main pole.

At block 630, the process 600 includes generating a spin-orbit torque from the spin Hall structure or generating a spin current from the injected electrical current. In certain embodiments, the electrical current injected to the spin Hall structure is converted to a spin current at a spin injection efficiency (β) of 0.3 to 1.75.

At block 640, the process 600 includes inducing precession of the spin torque structure from the spin-orbital torque. In certain embodiments, less electrical current due to the high spin injection efficiency is injected to the spin Hall structure to provide a spin current above the critical current switching current of the spin torque structure in comparison to a pseudo spin-valve structure. Since less electrical current is injected, there is less joule heating of spin Hall structure and less associated heating of the spin torque structure resulting in greater reliability of a SOT based head in comparison to a head using a pseudo spin-valve structure.

The benefits of having a SOT based head is that the spin polarization ratio of the SOT based head is about 3 to 12 times larger than that of a head using a pseudo spin-valve structure, reducing the critical switching current density by 3 to 12 times. As a result of the reduced critical switching current density, the SOT based head has a higher energy efficiency, such as about 3 to 12 times less energy used than that of a head using a pseudo spin-valve structure. Furthermore, the spin-torque layer and the spin Hall layer of the SOT based head are easier to form compared to the conventional pseudo spin-valve structure.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
   a main pole;
   a trailing shield;
   a spin Hall means for generating a spin-orbital torque; and
   a spin torque means for precessing from the spin-orbital torque, wherein the spin Hall means and the spin torque means are disposed between the main pole and the trailing shield.

2. The magnetic recording head of claim 1, wherein the spin Hall means and the spin torque means wrapped around at least three sides of the main pole.

3. The magnetic recording head of claim 1, wherein the trailing shield is a notchless trailing shield.

4. The magnetic recording head of claim 1, wherein the spin Hall means is recessed from a media facing surface of the main pole.

5. The magnetic recording head of claim 1, wherein the spin Hall means comprises beta phase tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), or antiferromagnets.

6. The magnetic recording head of claim 1, wherein the spin torque means is disposed on the spin Hall means.

7. The magnetic recording head of claim 1, wherein the spin Hall means is configured to injected electrical current to a spin current at a spin injection efficiency (β) of 0.3 to 1.75.

8. The magnetic recording head of claim 1, further comprising a dielectric material between the spin torque means and the main pole.

9. A method of writing data to a magnetic medium, comprising:
   providing a spin torque structure proximate a main pole and a trailing shield, the spin torque structure disposed over a spin Hall structure;
   injecting an electrical current to the spin Hall structure;
   generating a spin-orbit torque from the spin Hall structure; and
   inducing precession of the spin torque structure from the spin-orbital torque.

10. The method of claim 9, wherein the spin Hall structure is recessed from a media facing surface of the main pole.

11. The method of claim 9, wherein the spin Hall structure comprises beta phase tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), or antiferromagnets.

12. The method of claim 9, wherein the spin torque structure is disposed on the spin Hall structure.

13. The method of claim 9, wherein the electrical current injected to the spin Hall structure is converted to a spin current at a spin injection efficiency (β) of 0.3 to 1.75.

14. The method of claim 9, further comprising providing a dielectric material between the spin torque structure and the main pole.

15. The method of claim 9, wherein the spin Hall structure and the spin torque structure are wrapped around at least three sides of the main pole.

16. A method of writing data to a magnetic medium, comprising:
   providing a spin torque structure between a main pole and a notchless trailing shield, the spin torque structure disposed over a spin Hall structure;
   injecting an electrical current to the spin Hall structure;
   generating spin-orbit torque from the spin Hall structure; and
   inducing precession of the spin torque structure from the spin-orbital torque.

17. The method of claim 16, wherein the spin Hall structure is recessed from a media facing surface of the main pole.

18. The method of claim 16, wherein the spin Hall structure comprises beta phase Tantalum, beta phase tungsten, platinum, hafnium, an alloy of tungsten with hafnium, iridium, or bismuth doped copper, (Bi,Sb)Te, MnIr, XMn (X=Fe, Pd, Ir, and Pt), or antiferromagnets.

19. The method of claim 16, wherein the spin torque structure is disposed to the spin Hall structure.

20. The method of claim 16, wherein the electrical current injected to the spin Hall structure is converted to a spin current at a spin injection efficiency (β) of 0.3 to 1.75.

* * * * *